(12) United States Patent
Mun et al.

(10) Patent No.: US 10,094,097 B2
(45) Date of Patent: Oct. 9, 2018

(54) MULTI-PURPOSE WATER TANK

(71) Applicant: POWERRAIN CO., LTD., Jeju-si (KR)

(72) Inventors: Mi Na Mun, Jeju-si (KR); Dae Han Park, Jeju-si (KR)

(73) Assignee: POWERRAIN CO., LTD., Jeju-si (KR)

( * ) Notice: Subject to any disclaimer, the term of this patent is extended or adjusted under 35 U.S.C. 154(b) by 0 days.

(21) Appl. No.: 15/576,955

(22) PCT Filed: May 13, 2016

(86) PCT No.: PCT/KR2016/005117
§ 371 (c)(1),
(2) Date: Nov. 27, 2017

(87) PCT Pub. No.: WO2017/122878
PCT Pub. Date: Jul. 20, 2017

(65) Prior Publication Data
US 2018/0155904 A1    Jun. 7, 2018

(30) Foreign Application Priority Data
Jan. 13, 2016    (KR) .................. 10-2016-0004404

(51) Int. Cl.
*B01D 35/02*    (2006.01)
*E03B 11/02*    (2006.01)
(Continued)

(52) U.S. Cl.
CPC .............. *E03B 11/02* (2013.01); *B01D 35/02* (2013.01); *B01D 35/0273* (2013.01); *B01F 5/02* (2013.01);
(Continued)

(58) Field of Classification Search
CPC .. B01D 35/02; B01D 35/027; B01D 35/0273; B01D 35/04
(Continued)

(56) References Cited

U.S. PATENT DOCUMENTS 81,968 A * 9/1868 Wilson ............... B65D 83/0005
222/184
868,255 A * 10/1907 Disbrow ............... A61F 9/0008
210/390
(Continued)

FOREIGN PATENT DOCUMENTS

JP    2014-159856 A    9/2014
KR    2002-65473 Y1    2/2002
(Continued)

*Primary Examiner* — David L Sorkin
(74) *Attorney, Agent, or Firm* — Korus Patent, LLC; Seong Il Jeong

(57) ABSTRACT

The present invention relates to a multi-purpose water tank, and more specifically to a multi-purpose water tank, which enables water accommodated in the water tank and a liquid chemical to be effectively agitated when the liquid chemical is mixed with the water, which can prevent an agitated liquid discharged from the water tank from including impurities, thereby preventing an obstruction phenomenon when a sprinkler and a high-pressure spray nozzle are used, which enables a filtering rod installed inside the water tank and configured to filter out impurities to be separated, thereby facilitating the maintenance and repair of the filtering rod, and which enables impurities accumulated inside the water tank to be effectively discharged along with a small amount of water, thereby enabling the clean state of the water tank to be maintained.

6 Claims, 9 Drawing Sheets

(51) Int. Cl.
*B01F 5/02* (2006.01)
*C02F 1/00* (2006.01)
*B65D 88/02* (2006.01)
*B65D 90/00* (2006.01)
*E03B 11/00* (2006.01)
*B01D 35/027* (2006.01)
*C02F 1/40* (2006.01)
*C02F 1/52* (2006.01)
*B65D 90/14* (2006.01)

(52) U.S. Cl.
CPC ............. *B65D 88/02* (2013.01); *B65D 90/00* (2013.01); *C02F 1/00* (2013.01); *C02F 1/40* (2013.01); *C02F 1/5281* (2013.01); *E03B 11/00* (2013.01); *B65D 90/14* (2013.01)

(58) Field of Classification Search
USPC ................................ 210/108, 172.1, 497.01
See application file for complete search history.

(56) References Cited

U.S. PATENT DOCUMENTS

| | | | | |
|---|---|---|---|---|
| 3,392,837 | A | * | 7/1968 | Sanzenbacher ........ B01D 35/00 210/282 |
| 4,491,520 | A | * | 1/1985 | Jaye ....................... C02F 1/002 210/232 |
| 2013/0233890 | A1 | * | 9/2013 | Melzer ................... C02F 1/003 222/189.06 |

FOREIGN PATENT DOCUMENTS

| | | |
|---|---|---|
| KR | 10-2007-0003749 A | 1/2007 |
| KR | 10-0825680 B1 | 4/2008 |

* cited by examiner

MULTI-PURPOSE WATER TANK

TECHNICAL FIELD

The present invention relates to a multi-purpose water tank, and more specifically to a multi-purpose water tank, which enables water accommodated in the water tank and a liquid chemical to be effectively agitated when the liquid chemical is mixed with the water, which can prevent an agitated liquid discharged from the water tank from including impurities, thereby preventing an obstruction phenomenon when a sprinkler and a high-pressure spray nozzle are used, which enables a filtering rod installed inside the water tank and configured to filter out impurities to be separated, thereby facilitating the maintenance and repair of the filtering rod, and which enables impurities accumulated inside the water tank to be effectively discharged along with a small amount of water, thereby enabling the clean state of the water tank to be maintained.

BACKGROUND ART

In conventional water tanks, various types of impurities and foreign materials are stacked in the bottoms of the insides of the water tanks during use, the water tanks become grounds for the propagation of bacteria because water residues remain along with the impurities when water is drained, and there are lots of difficulty and inconvenience with the complete cleaning of the insides of the water tanks.

Furthermore, in the conventional water tanks, a water filtering method is configured such that a hose and a filtering mesh are connected outside each of the water tanks, the hose and the filtering mesh are introduced into the water tank, and introduced water is passed through a separate filtering device. Accordingly, filtering efficiency is degraded, pressure is reduced or a motor breaks down frequently due to a burden imposed on an apparatus, and the rate of occurrence of industrial accidents is also high due to the manual performance of filtering work.

Furthermore, when a cleaning agent (a liquid chemical) is used for complete cleaning during the cleaning of the inside of the water tank, a residue cleaning fluid component remains inside the water tank, and thus a plurality of problems occur in that the residue cleaning fluid component acts as a factor which damages health and an environment, etc.

In order to overcome the above-described problems, preceding Korean Patent No. 10-0802602 entitled a multi-purpose universal water tank discloses a technology for providing a multi-purpose water tank in which a filtering part capable of filtering out various types of impurities or foreign materials is installed in the lower portion of the water tank and a backwashing means is provided to clean the impurities filtered out by the filtering part.

However, the impurities filtered out by the filtering part installed in the conventional water tank cannot be completely eliminated, a problem with the filtering of water occurs due to the continuous adsorption of foreign materials onto the filtering part in the case of the long-term use of the water tank, and a problem occurs in that usability is degraded because it is difficult to replace and repair the filtering part.

DISCLOSURE

Technical Problem

The present invention has been conceived by taking into account the above-described situations, and an object of the present invention is to provide a multi-purpose water tank: in which a filtering rod capable of filtering out impurities included in water accommodated in the water tank or an agitated liquid while enabling the water or agitated liquid to be smoothly discharged is installed in the lower portion of the water tank in a replaceable manner, so that the maintenance and rapid repair of the filtering rod can be performed; and in which impurities included in water or impurities included in an agitated liquid are collected in an accommodation and filtering depression formed in the water tank and are smoothly discharged to the outside along with a small amount of water, so that the clean state of the water tank can be maintained.

Furthermore, water or an agitated liquid discharged from the water tank is prevented from including impurities, thereby preventing an obstruction phenomenon when a sprinkler and a high-pressure spray nozzle are used, and water accommodated in the water tank and a liquid chemical can be effectively agitated.

Technical Solution

In order to accomplish the above objects, the present invention provides a multi-purpose water tank in which an opening and closing cover is installed to selectively open and close an opening formed in the top of the water tank and the inside thereof is filled with water, wherein: a discharging and filtering means configured to discharge water accommodated in the inside of the water tank is installed in the lower portion of the front surface of the water tank, the bottom surface of the inside of the water tank is famed as an inclined surface inclined downward from the edges thereof to the center thereof so that a small amount of water flows to the center along with impurities remaining on the bottom surface of the inside of the water tank when the small amount of water remains in the water tank, and an accommodation and filtering depression configured to accommodate water and impurities collected at the center along the inclined surface is famed to be inclined downward from the center of the water tank to the direction of the discharging and filtering means; and the discharging and filtering means is configured to include: a hollow coupler installed in the lower side surface of the outside of the water tank to communicate with the accommodation and filtering depression; a filtering rod installed to selectively enter and exit in the direction of the accommodation and filtering depression through the coupler, and installed such that one side end thereof in the lengthwise direction thereof is caught on the inside of the coupler and the other side end thereof in the lengthwise direction is supported on the bottom surface of the accommodation and filtering depression so that the portion of the filtering rod between the one side end and the other side end in the lengthwise direction is spaced from the bottom surface of the accommodation and filtering depression by a predetermined distance; and a connection coupler detachably installed on the coupler, and connected to a water flow conduit part in the state of accommodating the coupler.

Furthermore, the filtering rod may include: a hollow filtering mesh installed to be spaced apart from the bottom surface of the accommodation and filtering depression by a predetermined distance, and configured to filter out impurities included in discharged water; a stop protrusion configured to be caught in the coupler in the state of being coupled to one side of the filtering mesh in the lengthwise direction thereof, and configured such that a grip is formed thereon to enable a user to grip the stop protrusion; and a support configured to be supported on the bottom surface of the accommodation and filtering depression in the state of being coupled to the other side of the filtering mesh in the lengthwise direction thereof.

Furthermore, an agitation and spouting nozzle part configured to agitate water accommodated in the water tank by spouting water pumped by a water pump into the water tank may be installed on the bottom surface of the inside of the water tank.

Furthermore, the agitation and spouting nozzle part is configured to include: a first agitation nozzle installed in the inside of the back surface of the water tank opposite to the direction in which the discharging and filtering means is installed, installed adjacent to the bottom surface of the water tank, and configured to spout the water pumped from the water pump in the direction of the discharging and filtering means; and second agitation nozzles installed on the lower side surfaces of the inside of the water tank in the direction in which the discharging and filtering means is installed, spaced apart from the accommodation and filtering depression to left and right sides by a predetermined distance, and provided to be inclined upward so that the water pumped from the water pump is spouted toward upper sides of side surfaces of the water tank.

Furthermore, the water flow conduit part may include a connection pipe connected to the connection coupler, and a branch part formed to be branched off from the connection pipe, and configured to include a water introduction conduit for backwashing the filtering rod by introducing water into the inside of the filtering rod and a water discharge conduit for discharging water accommodated in the water tank; and cutoff valves are installed on the water introduction conduit and the water discharge conduit, respectively.

Furthermore, a residual discharge conduit installed in the state in which a hollow portion thereof comes into contact with the bottom surface of the accommodation and filtering depression and configured to discharge a small amount of water and impurities accommodated inside the accommodation and filtering depression is installed in the water tank; and a plurality of support legs configured to support the water tank is installed on the outside of the bottom of the water tank in the state of being spaced apart from one another by a predetermined distance.

Advantageous Effects

According to the present invention: the bottom of the water tank is inclined; water or an agitated liquid is discharged in the state in which impurities included in the water or agitated liquid have been eliminated by the discharging and filtering means installed in the direction in which the water is discharged, so that an obstruction phenomenon can be prevented when a sprinkler and a high-pressure spray nozzle are used; and the filtering rod of the discharging and filtering means is installed in the lower portion of the water tank in a replaceable manner, so that the maintenance and rapid repair of the filtering rod can be performed.

Furthermore, water and a liquid chemical can be effectively performed by the agitation and spouting nozzle part installed inside the water tank, and impurities collected in the accommodation and filtering depression can be smoothly discharged to the outside along with a small amount of water, so that the clean state of the water tank can be maintained, thereby enabling the effect of improving usability to be expected.

BEST MODES

Figure 1:
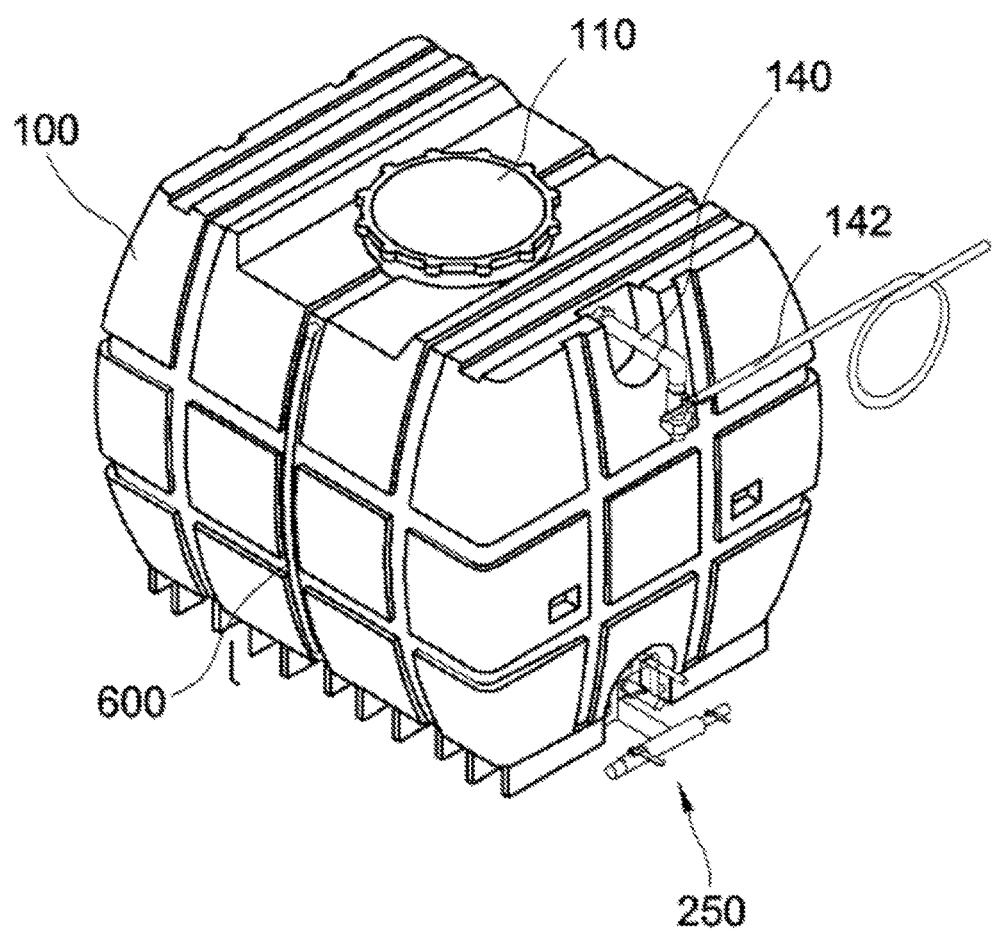
FIG. 1 is a perspective view showing the state of a multi-purpose water tank according to an embodiment of the present invention.

A multi-purpose water tank according to the present invention will be described in detail below with reference to the accompanying drawings. Prior to the description, it will be noted that when it is determined that a detailed description of a related well-known function or component may unnecessarily make the gist of the present invention obscure in the following description of the present invention, the detailed description will be omitted.

Furthermore, the terms which will be described are terms which are set by taking into account the functions thereof in the present invention, and the meanings of the terms may vary according to the intention or practice of a producer or manufacturer of products. The thicknesses of lines, the sizes of components, or the like illustrated in the drawings may be exaggerated for clarity and ease of description. The embodiments described herein and the configurations illustrated in the accompanying drawings are merely preferred embodiments of the present invention, and do not represent the overall technical spirit of the present invention. Accordingly, it should be appreciated that there may be various equivalents and modifications which replace the embodiments and the configurations at the time when the present application is filed.

Furthermore, the directional terms "front surface," "back surface," "side surface," "lower portion," etc. are used in connection with the directions of illustrated drawings. The components of the embodiments of the present invention can be placed in various directions. Accordingly, the directional term are used for illustrative purposes, but are not used for limitative purposes.

Figure 2:
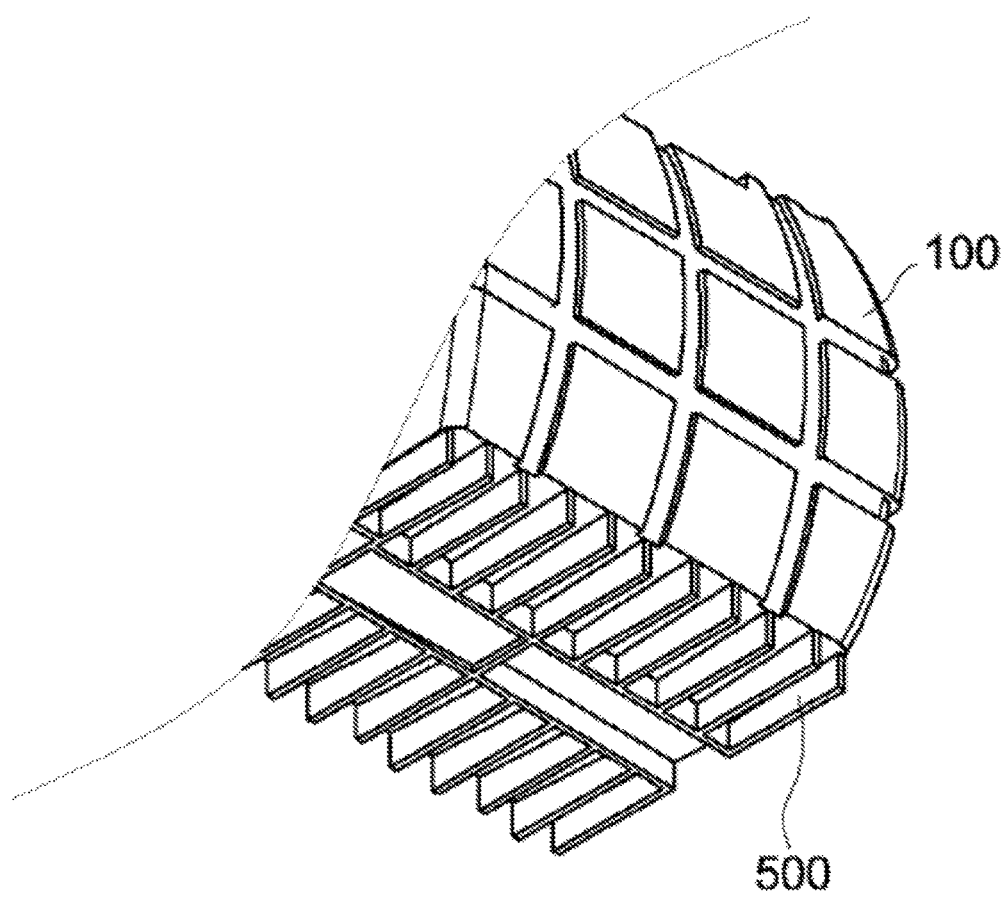
FIG. 2 is a bottom perspective view showing the bottom state of the multi-purpose water tank according to the embodiment of the present invention.
Figure 3:
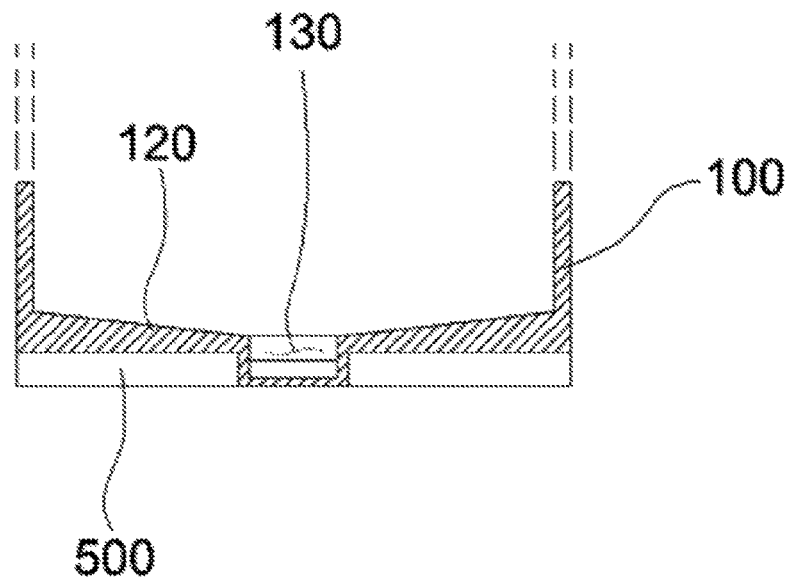
FIG. 3 is a front sectional view showing the sectional state of the multi-purpose water tank according to the embodiment of the present invention.
Figure 4:
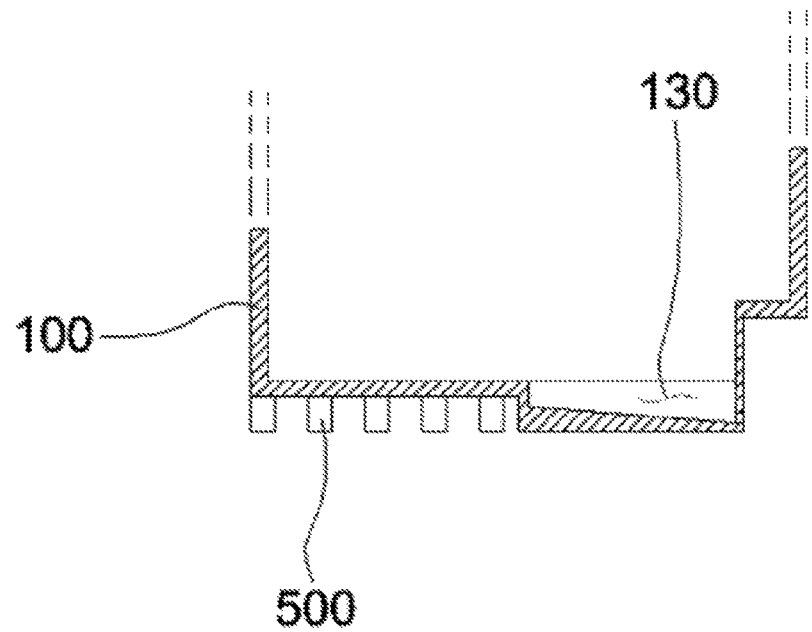
FIG. 4 is a side sectional view showing the side sectional state of the multi-purpose water tank according to the embodiment of the present invention.
Figure 5:
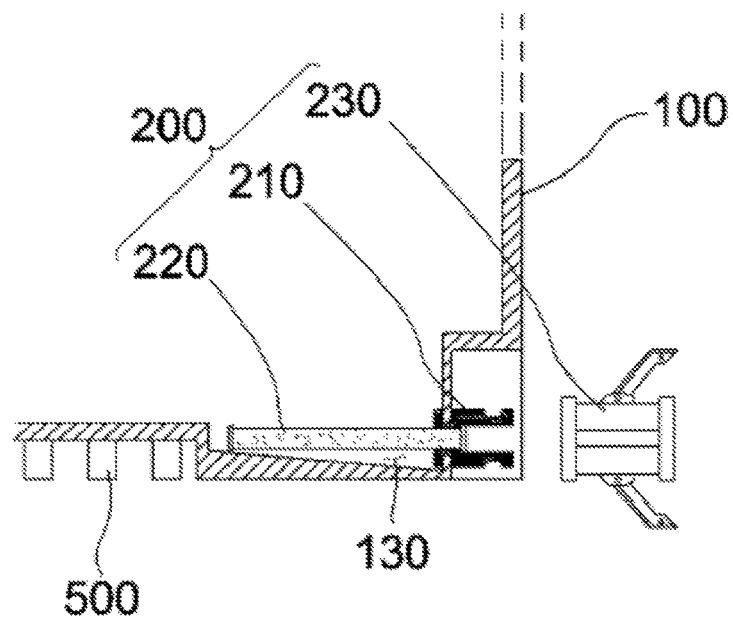
FIG. 5 is a view showing the state in which a discharging and filtering means has been installed in the multi-purpose water tank according to the embodiment of the present invention.
Figure 6:
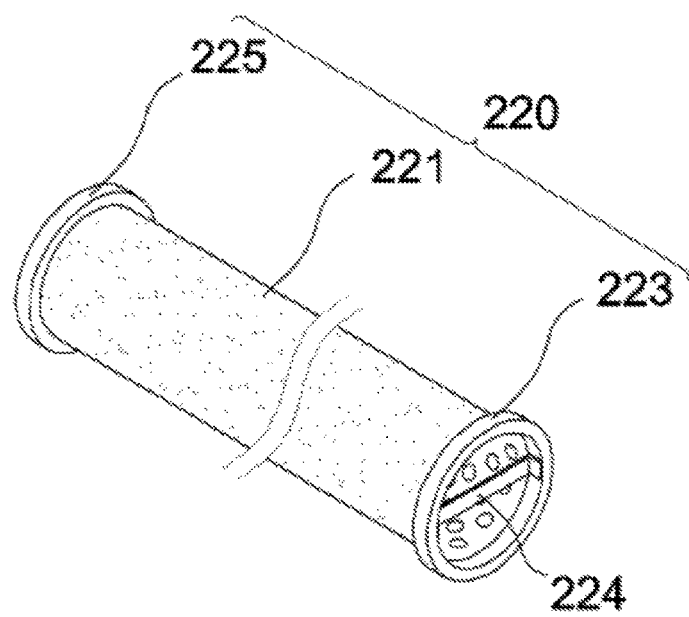
FIG. 6 is a view showing the state of the filtering rod of the multi-purpose water tank according to the embodiment of the present invention.
Figure 7:
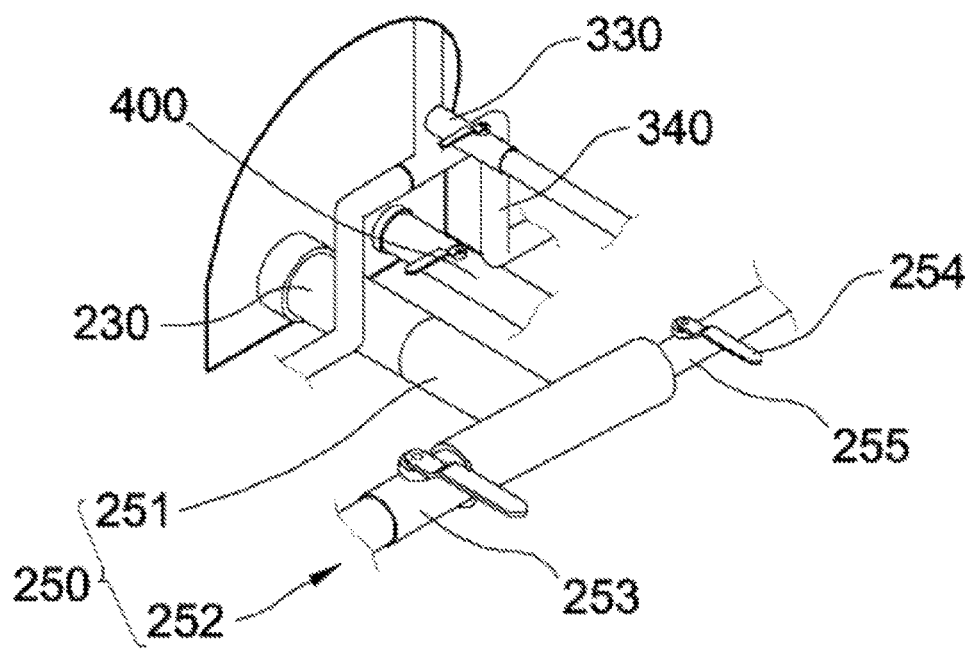
FIG. 7 is a view showing the state in which a water flow conduit part according to an embodiment of the present invention has been installed.
Figure 8:
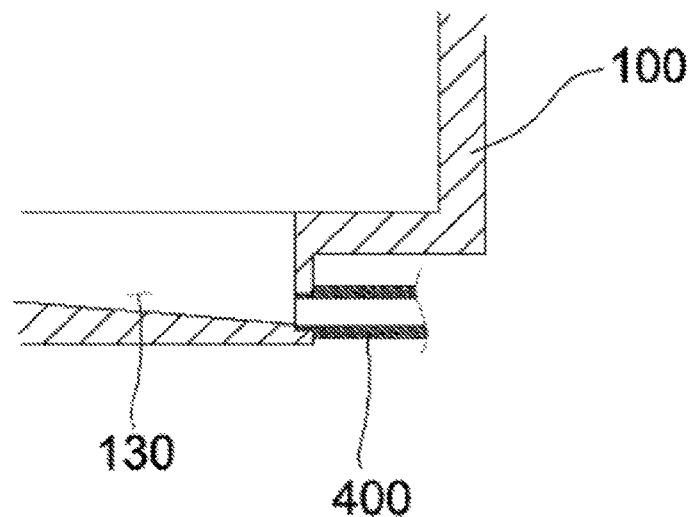
FIG. 8 is a sectional view schematically showing the state in which a residual discharge conduit has been installed in the multi-purpose water tank according to the embodiment of the present invention.
Figure 9:
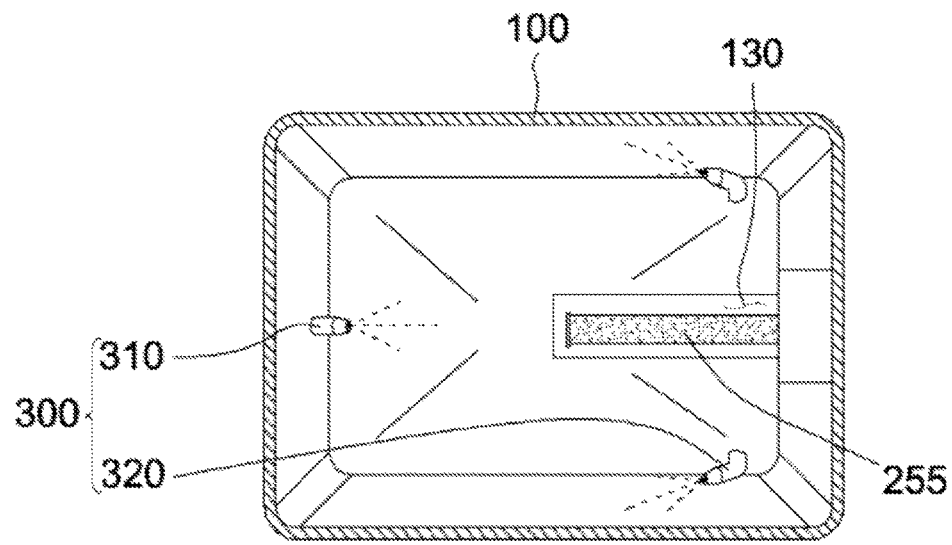
FIG. 9 is a view showing the state in which an agitation and spouting nozzle part according to the present invention has been installed.
Figure 10:
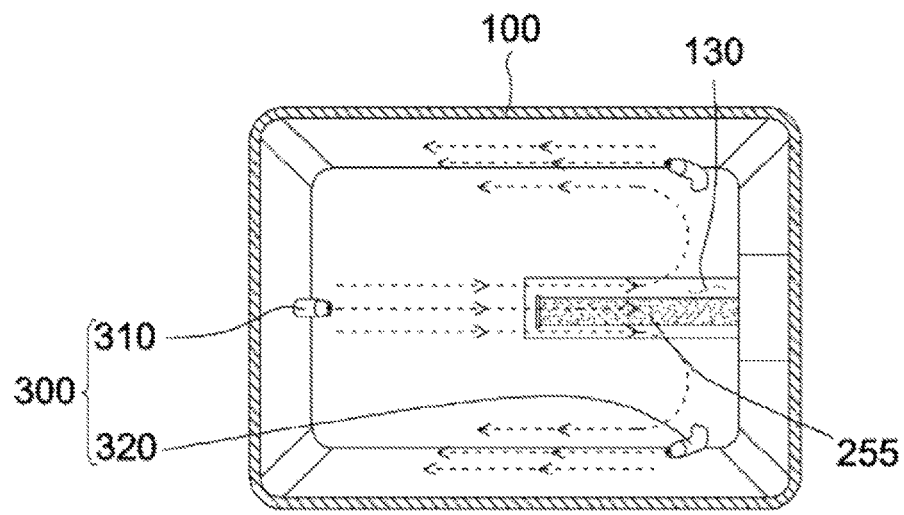
FIG. 10 is a plan sectional view showing the flows of water formed by the agitation and spouting nozzle part according to the present invention.
Figure 11:
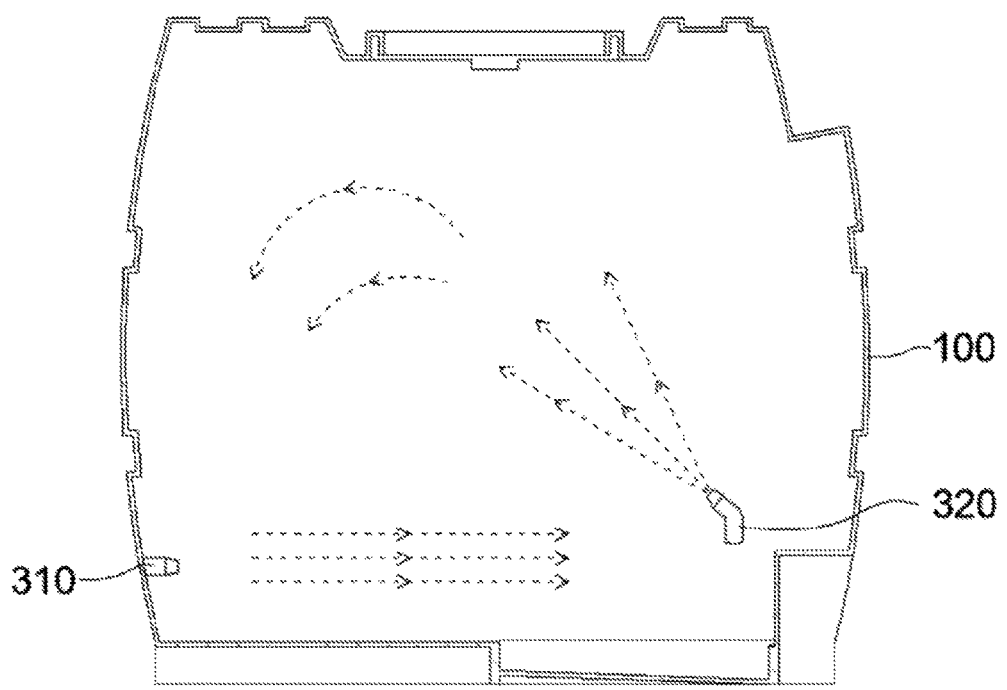
FIG. 11 is a side sectional view showing the flows of water formed by the agitation and spouting nozzle part according to the present invention.

FIG. 1 is a perspective view showing the state of a multi-purpose water tank according to an embodiment of the present invention, FIG. 2 is a bottom perspective view showing the bottom state of the multi-purpose water tank according to the embodiment of the present invention, FIG. 3 is a front sectional view showing the sectional state of the multi-purpose water tank according to the embodiment of the present invention, FIG. 4 is a side sectional view showing the side sectional state of the multi-purpose water tank according to the embodiment of the present invention, FIG. 5 is a view showing the state in which a discharging and filtering means has been installed in the multi-purpose water tank according to the embodiment of the present invention, FIG. 6 is a view showing the state of the filtering rod of the multi-purpose water tank according to the embodiment of the present invention, FIG. 7 is a view showing the state in which a water flow conduit part according to an embodiment of the present invention has been installed, FIG. 8 is a sectional view schematically showing the state in which a residual discharge conduit has been installed in the multi-purpose water tank according to the embodiment of the present invention, FIG. 9 is a view showing the state in which an agitation and spouting nozzle part according to the present invention has been installed, FIG. 10 is a plan sectional view showing the flows of water formed by the agitation and spouting nozzle part according to the present invention, and FIG. 11 is a side sectional view showing the flows of water formed by the agitation and spouting nozzle part according to the present invention.

The multi-purpose water tank according to the present invention may be fabricated and installed to have various shapes, such as a cylindrical shape, a hexahedral shape, and the like, according to its installation place and purpose of use. Furthermore, an opening and closing cover is installed to selectively open and close an opening formed in the top of the water tank, and a water introduction pipe 140 provided with a float valve 141 is installed in the upper portion of a water tank 100 in a conduit form so that water can be automatically introduced in accordance with a water level.

In this case, a separate tank cleaning valve 142 is installed in the water introduction pipe 140, and thus enables a user to clean the inside of the water tank by using sprayed washing water.

Furthermore, in the multi-purpose water tank according to the present invention, a purpose-based liquid chemical (a power-type agricultural pesticide, a liquid agricultural pesticide, or the like) is introduced into water accommodated inside the water tank, the chemical and the water are agitated, and an agitated liquid is discharged in the state in which impurities have been filtered out via a discharging and filtering means. Accordingly, when a sprinkler and a high-pressure spray nozzle are used, the sprinkler and the high-pressure spray nozzle can be prevented from being obstructed, and the water tank can be desirably used for a long period of time for a desired purpose, such as irrigation, pest control, disease prevention, liquid-manure distribution, etc.

Furthermore, when impurities included in an agitated liquid are accumulated in an accommodation and filtering depression formed inside the water tank, impurities can be discharged to the outside through a residual discharge conduit along with a small amount of water. Accordingly, advantages lie in that a liquid chemical can be prevented from remaining in the water tank, the water tank can be completely washed, a filtering rod can be maintained in a clean state through the backwashing of the filtering rod, and maintenance/repair can be easily performed because the filtering rod can be separated.

Furthermore, impurities accumulated in the accommodation and filtering depression of the water tank can be discharged to the outside through the residual discharge conduit by the backwashing of the filtering rod, and thus the internal state of the water tank can be kept clean.

Figure 13:
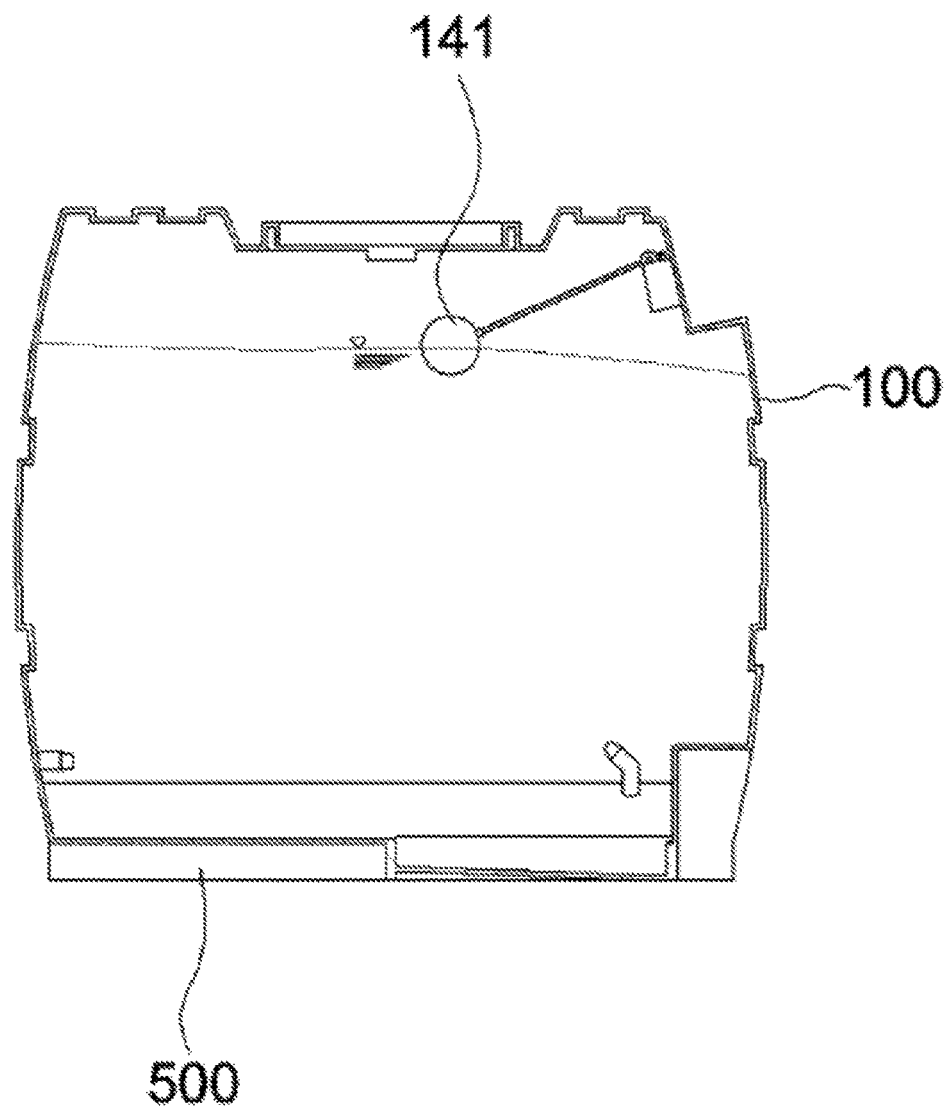
FIG. 13 is a view showing the state of a float valve installed in a multi-purpose water tank according to the present invention.

Water is introduced into the water tank 100 through the water introduction pipe 140, and the supply of water is automatically stopped by the float valve 141 when water reaches a full water level, as shown in FIG. 13.

In this case, in the following description of the multi-purpose water tank according to the present invention, the description will be given based on a water tank having a hexahedral shape.

As shown in FIGS. 1 to 11, a multi-purpose water tank according to an embodiment of the present invention is formed to have a hexahedral shape, and will be described with the direction in which the float valve 141 and a discharging and filtering means 200 to be described later are installed set to a front surface, the direction to which the discharging and filtering means 200 is opposite set to a back surface, and a surface portion which connects the front and back surfaces of the water tank set to a side surface.

In this case, the discharging and filtering means 200 configured to discharge water accommodated inside the water tank 100 is installed in the lower portion of the front surface of the water tank 100. The bottom surface of the inside of the water tank 100 is formed as an inclined surface 120 inclined downward from the edges thereof to the center thereof, and is thus configured to enable a small amount of remaining water to flow to the center along with impurities remaining on the bottom surface of the inside of the water tank when the small amount of water remains in the water tank 100. An accommodation and filtering depression 130 configured such that impurities included in water are collected at the center thereof along the inclined surface 120 is formed to be inclined downward from the center of the water tank 100 to the direction of the discharging and filtering means 200.

In other words, when water is accommodated inside the water tank 100, the water is collected at the center along the inclined surface 120. The water collected at the center moves along the accommodation and filtering depression 130, and naturally flows in the discharge direction of the discharging and filtering means 200.

In this case, when a small amount of water remains inside the water tank 100, impurities, together with the water, are moved in the direction of the accommodation and filtering depression 130 along the inclined surface 120, and are accommodated in the accommodation and filtering depression 130. When the small amount of water and the impurities are accommodated inside the accommodation and filtering depression 130 and a predetermined quantity of impurities are accumulated in the accommodation and filtering depression 130, the impurities are discharged to the outside through a residual discharge conduit 400 to be described later, thereby preventing impurities inside the water tank from being continuously accumulated.

The discharging and filtering means 200 is configured to include: a hollow coupler 210 installed on the lower surface of the outside of the water tank 100 to communicate with the accommodation and filtering depression 130; a filtering rod 220 installed to selectively enter and exit in the direction of the accommodation and filtering depression 130 through the coupler 210; and a connection coupler 230 separably connected to the coupler 210.

In other words, the coupler 210 is a hollow member, is mounted in a through hole formed in the lower side surface of the water tank 100, and is installed to communicate with the accommodation and filtering depression 130 inside the water tank 100. The filtering rod 220 is installed to pass through the inside of the coupler 210 and to be located in the accommodation and filtering depression 130. In this case, the filtering rod 220 is in the state in which one side end of the filtering rod 220 is caught on the inside of the coupler 210.

Furthermore, the filtering rod 220 is installed to selectively enter and exit in the direction of the accommodation and filtering depression 130 through the coupler 210. In this case, the filtering rod 220 is installed such that one side end thereof in the lengthwise direction thereof is caught on the inside of the coupler 210 and the other side end thereof in the lengthwise direction thereof is supported on the bottom surface of the accommodation and filtering depression 130 so that the portion of the filtering rod 220 between the one and other side ends thereof in the lengthwise direction thereof is spaced apart from the bottom surface of the accommodation and filtering depression 130 by a predetermined distance.

In this case, the filtering rod 220 is configured to include: a hollow filtering mesh 221 installed to be spaced apart from the bottom surface of the accommodation and filtering depression 130 by a predetermined distance, and configured to filter out impurities included in discharged water; a stop protrusion 223 configured to be caught in the coupler 210 in the state of being coupled to one side of the filtering mesh 221 in the lengthwise direction of the filtering mesh 221, and configured such that a grip 224 is formed thereon to enable a user to grip the stop protrusion 223; and a support 225 configured to be supported on the bottom surface of the accommodation and filtering depression 130 in the state of being coupled to the other side of the filtering mesh 221 in the lengthwise direction of the filtering mesh 221.

In this case, the reason why the filtering mesh 221 is installed to be spaced apart from the bottom surface of the accommodation and filtering depression 130 by a predetermined distance is to prevent impurities, entering into the accommodation and filtering depression 130 and accumulated on the bottom surface of the accommodation and filtering depression, from being excessively adsorbed onto the filtering mesh 221 and thus degrading the performance of the filtering of water.

Furthermore, the stop protrusion 223 is caught on the inside of the coupler 210 of the discharging and filtering means 200 in the state of being coupled to the one side end of the filtering mesh 221 in the lengthwise direction of the filtering mesh 221. The grip 224 is installed on the stop protrusion 223, and thus enables the replacement of the filtering rod and cleaning work to be easily performed.

The connection coupler 230 is separably installed on the coupler in the state of accommodating the coupler 210, and is connected to a water flow conduit part 250.

In this case, the water flow conduit part 250 is configured to include: a connection pipe 251 connected to the connection coupler 230; and a branch part 252 formed to be branched off from the connection pipe 251, and configured to include a water introduction conduit 253 for backwashing the filtering rod 220 by introducing water into the inside of the filtering rod 220 and a water discharge conduit 254 for discharging water accommodated in the water tank 100.

Cutoff valves 255 are installed on the water introduction conduit 253 and the water discharge conduit 254, respectively.

When the water introduction conduit 253 is used, the filtering rod 220 is backwashed by closing the cutoff valve installed on the water discharge conduit 254 and opening the cutoff valve installed on the water introduction conduit 253.

In other words, when the filtering rod 220 is washed after water accommodated in the water tank 100 has been all used, water supplied from the outside is allowed to flow into the filtering rod 220 through the water introduction conduit 253 and to be spouted into the water tank 100 by opening the cutoff valve installed on the water introduction conduit 253, thereby enabling impurities adsorbed onto the filtering rod 220 to be separated.

Furthermore, when water accommodated in the water tank 100 is used, the water accommodated in the water tank 100 is enabled to be used by closing the cutoff valve installed on the water introduction conduit 253 and opening the cutoff valve installed on the water discharge conduit 254.

In this case, the residual discharge conduit 400 installed in the state in which the hollow portion thereof comes into contact with the bottom surface of the accommodation and filtering depression 130 and configured to discharge a small amount of water and impurities accommodated inside the accommodation and filtering depression 130 is installed in the water tank 100.

In other words, when only a predetermined amount of water remains in the water tank 100 after water accommodated in the water tank 100 has been used, impurities have been accumulated in the accommodation and filtering depression 130. In this case, the impurities accommodated in the accommodation and filtering depression 130 are allowed to be discharged to the outside along with the small amount of water by opening the residual discharge conduit 400.

Furthermore, when impurities and washing water are accommodated in the accommodation and filtering depression 130 after the filtering rod 220 has been backwashed, the impurities separated from the filtering rod 220 and the washing water are allowed to be discharged to the outside by opening the residual discharge conduit 400.

Since water and impurities accommodated in the accommodation and filtering depression 130 need to be discharged to the outside as described above, the hollow portion of the residual discharge conduit 400 must not be at a location higher than the bottom surface of the accommodation and filtering depression 130.

Furthermore, a residual agitated liquid accommodated in the water tank 100 can be completely eliminated through the residual discharge conduit 400, and thus mixture with a previously used agitated liquid can be prevented in the case where agitation is performed for another purpose and another mixture.

Meanwhile, an agitation and spouting nozzle part 300 configured such that water pumped by a water pump (not shown) is spouted into the water tank 100 and agitates water accommodated in the water tank 100 is installed on the bottom surface of the inside of the water tank 100.

In other words, when water and a specific component (an agricultural pesticide, or the like) are agitated inside the water tank 100, the water and the agricultural pesticide are agitated by water spouted from the agitation and spouting nozzle part 300 without a separate agitation device. Accordingly, the economic burden of a farm can be reduced by decreasing the manufacturing cost of the water tank, and also the usability of the water tank can be improved by adding an agitation function.

In this case, the agitation and spouting nozzle part 300 is installed in the inside of the back surface of the water tank 100 opposite to the direction in which the discharging and filtering means 200 is installed, and is also installed adjacent to the bottom surface of the water tank. The agitation and spouting nozzle part 300 is configured to include: a first agitation nozzle 310 configured to spout water pumped from the water pump in the direction of the discharging and filtering means 200; and second agitation nozzles 320 installed on the lower side surfaces of the inside of the water tank 100 in the direction in which the discharging and filtering means 200 is installed, spaced apart from the accommodation and filtering depression 130 to left and rights sides by a predetermined distance, and provided to be inclined upward so that water pumped from the water pump can be spouted to the upper sides of the side surfaces of the water tank 100.

In this case, the first and second agitation nozzles 310 and 320 are connected through a distribution conduit 340 branched off from a distribution part 330 installed in the direction in which the discharging and filtering means 200 is installed. Water pumped from the water pump is distributed to the distribution conduit 340 through the distribution part 330, and is spouted into the water tank 100 via the first and second agitation nozzles 310 and 320.

Water spouted from the first agitation nozzle 310 is spouted in the direction of the front surface of the water tank in the direction in which the discharging and filtering means 200 is installed, and water spouted from the second agitation nozzles 320 is spouted in the direction of the upper sides of the side surfaces of the water tank, with the result that overall water accommodated inside the water tank can be effectively agitated.

In other words, when a specific component (an agricultural pesticide, or the like) is mixed with and agitated along with water accommodated inside the water tank, overall water accommodated in the water tank is agitated by the first and second agitation nozzles 310 and 320 in the range from the bottom surface of the water tank to the surface of the water, thereby enabling agitation efficiency to be improved.

Furthermore, a plurality of support legs 500 is installed on the outside of the bottom surface of the water tank 100 to support the water tank in the state of being spaced apart from one another by a predetermined distance.

In other words, in the case of a hexahedral water tank, the rectilinear support legs 500 are formed on the bottom portion of the water tank, and thus spaces the water tank apart from a support surface by a predetermined distance. In the case where the water tank 100 is cylindrical, the support legs 500 are radially formed on the bottom surface of the outside of the water tank, and thus spaces the water tank from a support surface by a predetermined distance. In this case, it is preferred that the support legs 500 are integrated with the bottom surface of the water tank 100 when the water tank 100 is manufactured through injection molding.

Furthermore, a water amount checking pipe 600 configured to check the amount of water accommodated in the water tank 100 may be installed in the water tank 100 according to the present invention.

Figure 12:
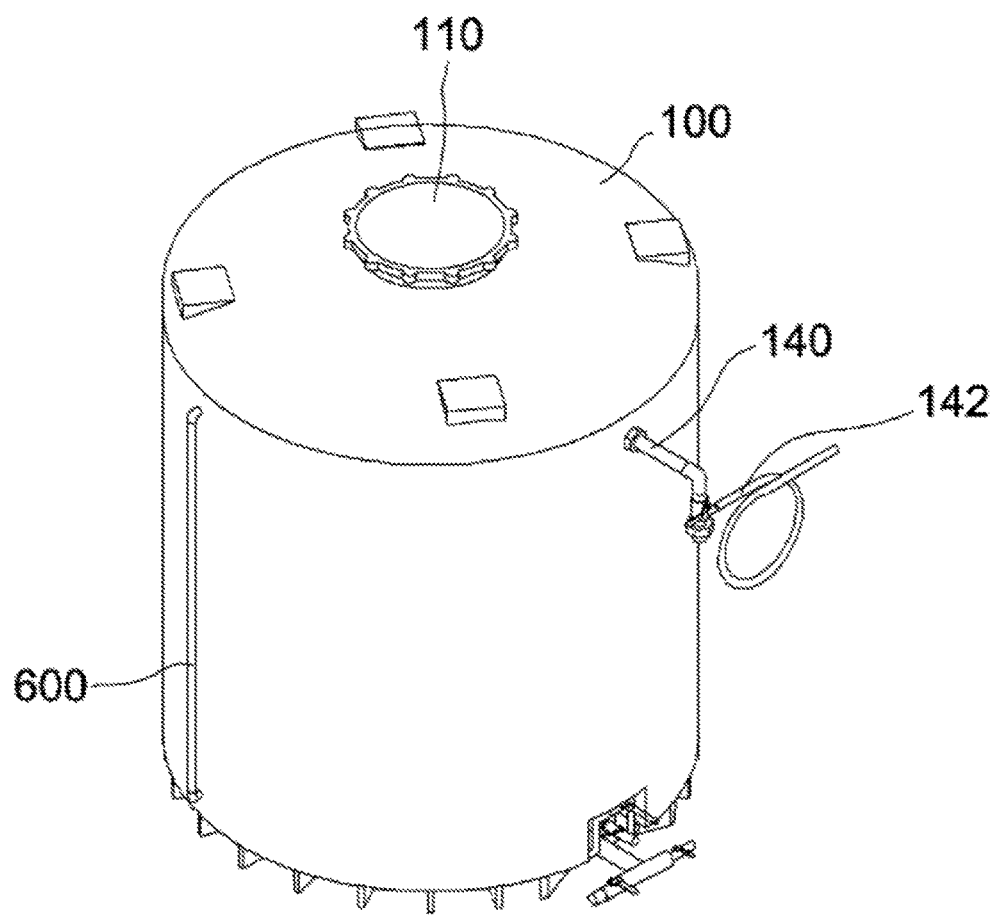
FIG. 12 is a view showing the state of a multi-purpose water tank according to another embodiment of the present invention.

Furthermore, as shown in FIG. 12, the multi-purpose water tank according to the present invention may be formed to be cylindrical. In this case, the bottom surface of the inside of the water tank is also formed to have an inclined surface. It is preferred that the accommodation and filtering depression inside the water tank is formed to be inclined, as described above.

Although the present invention has been described in detail above, the present invention is not limited to the embodiments. The technical spirit of the present invention reaches the range within which any person having ordinary knowledge in the art to which the present invention pertains may make various alterations or modifications without departing from the gist of the present invention which is claimed in the attached claims.

The invention claimed is:

1. A multi-purpose water tank in which an opening and closing cover is installed to selectively open and close an opening formed in a top of the water tank and an inside thereof is filled with water, wherein:
a discharging and filtering means (200) configured to discharge water accommodated in the inside of the water tank is installed in a lower portion of a front surface of the water tank (100); a bottom surface of the inside of the water tank (100) is formed as an inclined surface (120) inclined downward from edges thereof to a center thereof so that a small amount of water flows to the center along with impurities remaining on the bottom surface of the inside of the water tank (100) when the small amount of water remains in the water tank (100); an accommodation and filtering depression (130) configured to accommodate water and impurities collected at the center along the inclined surface (120) is formed to be inclined downward from the center of the water tank to a direction of the discharging and filtering means (200);
the discharging and filtering means (200) is configured to include: a hollow coupler (210) installed in a lower side surface of an outside of the water tank (100) to communicate with the accommodation and filtering depression (130); a filtering rod (220) installed to selectively enter and exit in a direction of the accommodation and filtering depression (130) through the coupler (210), and installed such that one side end thereof in a lengthwise direction thereof is caught on an inside of the coupler (210) and a remaining side end thereof in the lengthwise direction is supported on a bottom surface of the accommodation and filtering depression (130) so that a portion of the filtering rod (220) between the one side end and the remaining side end in the lengthwise direction is spaced from the bottom surface of the accommodation and filtering depression (130) by a predetermined distance; and a connection coupler (230) detachably installed on the coupler (210), and connected to a water flow conduit part (250) in a state of accommodating the coupler (210); and
the water flow conduit part (250) includes a connection pipe (251) connected to the connection coupler (230), and a branch part (252) formed to be branched off from the connection pipe (251), and configured to include a water introduction conduit (253) for backwashing the filtering rod (220) by introducing water into an inside of the filtering rod (220) and a water discharge conduit (254) for discharging water accommodated in the water tank (100); and cutoff valves (255) are installed on the water introduction conduit (253) and the water discharge conduit (254), respectively.

2. The multi-purpose water tank of claim 1, wherein the filtering rod (220) comprises: a hollow filtering mesh (221) installed to be spaced apart from the bottom surface of the accommodation and filtering depression (130) by a predetermined distance, and configured to filter out impurities included in discharged water; a stop protrusion (223) configured to be caught in the coupler (210) in a state of being coupled to one side of the filtering mesh (221) in a lengthwise direction thereof, and configured such that a grip (224) is formed thereon to enable a user to grip the stop protrusion (223); and a support (225) configured to be supported on the bottom surface of the accommodation and filtering depression (130) in a state of being coupled to a remaining side of the filtering mesh (221) in the lengthwise direction thereof.

3. The multi-purpose water tank of claim 2, wherein an agitation and spouting nozzle part (300) configured to agitate water accommodated in the water tank (100) by spouting water pumped by a water pump into the water tank (100) is installed on the bottom surface of the inside of the water tank (100).

4. The multi-purpose water tank of claim 3, wherein the agitation and spouting nozzle part (300) is configured to include: a first agitation nozzle (310) installed in an inside of a back surface of the water tank (100) opposite to a direction in which the discharging and filtering means (200) is installed, installed adjacent to the bottom surface of the water tank (100), and configured to spout the water pumped from the water pump in a direction of the discharging and filtering means (200); and second agitation nozzles (320) installed on lower side surfaces of the inside of the water tank (100) in the direction in which the discharging and filtering means (200) is installed, spaced apart from the accommodation and filtering depression (130) to left and right sides by a predetermined distance, and provided to be inclined upward so that the water pumped from the water pump is spouted toward upper sides of side surfaces of the water tank (100).

5. The multi-purpose water tank of claim 1, wherein a residual discharge conduit (400) installed in a state in which a hollow portion thereof comes into contact with the bottom surface of the accommodation and filtering depression (130) and configured to discharge a small amount of water and impurities accommodated inside the accommodation and filtering depression (130) is installed in the water tank (100).

6. The multi-purpose water tank of claim 5, wherein a plurality of support legs (500) configured to support the water tank (100) is installed on an outside of a bottom of the water tank (100) in a state of being spaced apart from one another by a predetermined distance.

\* \* \* \* \*